United States Patent Office 3,794,476
Patented Feb. 26, 1974

3,794,476
METHOD FOR THERMALLY TEMPERING GLASS SHEET BY LIQUID QUENCHING
Edmund R. Michalik, West Mifflin, and Harold R. Gorman, Oakmont, Pa., assignors to PPG Industries, Inc., Pittsburgh, Pa.
Continuation-in-part of abandoned applications Ser. No. 136,351, Ser. No. 136,352 and Ser. No. 136,353, all Apr. 22, 1971. This application Dec. 26, 1972, Ser. No. 318,360
Int. Cl. C03b 27/00
U.S. Cl. 65—116                                8 Claims

ABSTRACT OF THE DISCLOSURE

A method for tempering glass sheet is disclosed in which the glass is heated to a temperature above its strain point, but below its softening point and then contacted with an oxyalkylene polymer quenching medium. The oxyalkylene polymers provide a relatively high and uniform heat transfer which makes them particularly useful as tempering media for the tempering of thin glass.

CROSS REFERENCE TO RELATED APPLICATIONS

This application is a continuation-in-part of copending applications Ser. Nos. 136,351, 136,352 and 136,353, all filed on Apr. 22, 1971, all now abandoned.

BACKGROUND OF THE INVENTION

Field of the invention: This invention relates to thermal tempering of glass, especially in sheet form by immersion quenching.

Glass sheets are thermally tempered by heating them to an elevated temperature near the softening point of the glass, and then suddenly chilling the glass sheets sufficiently to cool rapidly the glass surface while the interior regions of the glass cool at a slower rate. This differential cooling pattern results in the development of a compressive stress in the glass surface and a tensile stress in the interior regions of the glass. The resultant tempered glass sheet has a much greater resistance to fracture than does an untempered glass sheet.

Description of the prior art: One well-known method of thermal tempering glass sheets involves the immersion quenching technique. In immersion quenching, rapid chilling is accomplished by contacting the surface of the glass with a tempering medium which is usually a liquid. Various liquids have been proposed for use in immersion quenching, such as molten salts in U.S. Pat. No. 2,285,596, molten metals in U.S. Pat. No. 170,339, light hydrocarbon oils in U.S. Pat. No. 6,973, mineral oils in U.S. Pat. No. 1,959,215, alcohols in U.S. Pat. No. 3,186,816 and chlorinated solvents in U.S. Pat. No. 2,265,308.

An article entitled "Evaluating the Effectiveness of Liquid-Toughening of Glass From the Cooling Capacity of the Chilling Medium" by I. A. Boguslavskii and O. I. Pukhlik, appearing in Steklo i Keramika, vol. 24, No. 3, pages 1–5, March 1967, discloses a method for determining the cooling capacity of various liquids for use in thermal tempering of glass sheets. The article concludes that the chilling medium for toughening glass can be characterized by relating the heat transfer coefficient as a function of the temperature of the surface being chilled.

Although not dealing with thermally tempering glass sheets, Canadian Pat. No. 758,015 describes a process for improving the crush resistance of glass spheres in which glass particles are heated to a temperature beyond the softening point of the glass, causing the particles to assume a spherical shape. The glass spheres are then discharged into an aqueous quenching bath which consists primarily of water thickened with about 4 percent to 10 percent by weight polyethylene oxide polymer.

The use of water solutions of ethylene oxide polymers, and more generally water solutions of alkylene oxide polymers as a tempering medium, has been disclosed for tempering metals. In U.S. Pat. No. 3,022,205, a quenching medium for metals consisting of a miniscule amount of a very high molecular weight ethylene oxide polymer dissolved in water is disclosed. U.S. Pat. No. 3,220,893 discloses a process for quenching metals employing as a quenching liquid about 0.1 to 30 percent by weight of a polyalkylene glycol dissolved in water. U.S. Pat. No. 3,475,232 discloses a method for quenching metals by immersing a heated metal in a bath consisting principally of water having dissolved therein about 10 percent by weight of an oxyalkylene polymer and about 10 percent by weight of a water-soluble alcohol such as glycerol.

All of the above tempering media have one or more disadvantages associated with them when they are used for quenching glass sheet. The molten metals and the molten salts must be maintained at a very high temperature to insure liquidity, thereby requiring expensive heating equipment. Hydrocarbon oils and alcohols have low flash points, can catch fire and explode. Chlorinated solvents can decompose and emit nauseous and toxic vapors. In addition, molten salts, hydrocarbon oils, alcohols and chlorinated solvents generally provide very low heat transfer at the glass-liquid interface and as a result, the degree of temper obtained in the resultant glass sheets is lower than desired. The polyalkylene oxide-water mediums are unsuitable for quenching glass sheets because they usually result in fracturing of the glass sheet.

Therefore, it would be desirable to provide a medium for quenching glass sheet which overcomes the disadvantages of those disclosed in the prior art. Thus, a tempering medium, preferably in liquid form, capable of being used at ambient temperatures or above which presents no fire or explosion hazards and which emits no offensive odors or poisonous fumes is desired. Further, the tempering medium should provide a heat transfer which achieves a high degree of temper in the glass sheets, particularly thin glass sheets, without fracturing the glass. This invention provides such a tempering medium.

SUMMARY OF THE INVENTION

In accordance with this invention, essentially water-free oxyalkylene polymers are provided for thermally tempering glass sheet.

DETAILED DESCRIPTION

Figure 1:
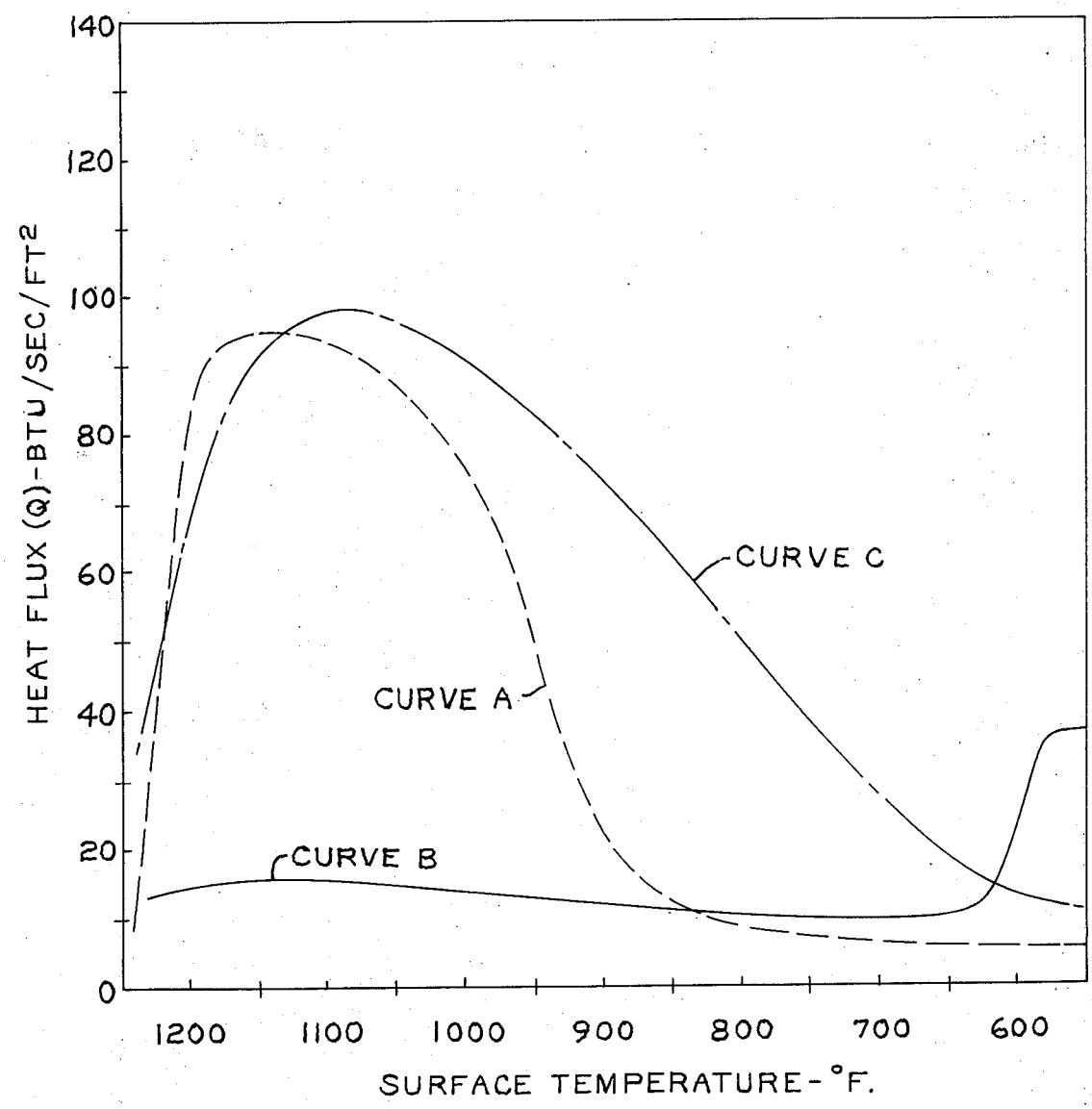
FIGS. 1, 5, 6 and 7 are graphs of the heat transfer (heat flux) of various tempering media plotted against surface temperature.

The novel quenching mediums of the invention are oxyalkylene polymers, particularly polyoxyalkylene glycols, which are hydroxyl-terminated oxyalkylene polymers. The oxyalkylene polymers can be homopolymers of ethylene oxide, propylene oxide or copolymers of ethylene oxide with one or more additional alkylene oxides, such as propylene oxide, butylene oxide and the like. The oxyalkylene polymers are produced by polymerizing an alkylene oxide or a mixture of alkylene oxides in the presence of a catalyst and a starter. Suitable catalysts are sodium and potassium hydroxides. The starters are compounds which have at least one active hydrogen atom. Suitable starters are water, monohydric alcohols such as methanol, ethanol, propanols, butanols; dihydric alcohols such as ethylene glycol, diethylene glycol, propylene glycol; trihydric alcohols such as glycerine, 1,1,1-trimethylol propane, 1,2,6-hexanetriol; tetrahydric alcohols such as pentaerythritol; hexahydric alcohols such as sorbitol; higher functional alcohols such as dipentaerythritol; monoamines such as methylamine, ethylamine, butylamine, aniline and ammonia; polyamines such as ethylenediamine, diethylenetriamine, toluene diamine; mono-polyfunctional amines such as diethanolamine, triisopropanolamine, aniline, dihydric phenols such as hydroquinone, catechol, resorcinol and 2,2-bis(4 - hydroxyphenyl)propane. The products of such reaction will be linear or branched oxyalkylene polymers, depending on the functionality of the starter compound. The chains optionally can be terminated with hydroxyl groups. Also envisioned by this invention is that some or all of these hydroxyl groups may be etherified or esterified.

The preferred oxyalkylene polymers are polyoxyalkylene glycols which are liquids at room temperature, and more preferably which are water soluble. Oxyalkylene polymers which are solids at room temperature can be used but, for convenience, they should be melted before tempering operations are conducted. Water-insoluble polyoxyalkylene polymers can also be used, but necessitate cleaning the glass sheet after tempering with something other than a water rinse. Among the particular types of polyoxyalkylene polymers which can be used in the tempering process of this invention are the following:

Polyoxyethylene glycols,

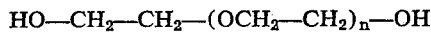

where $n=1$ to 10,000, range at room temperature from water-white liquids to waxy solids. Those above 1000 in molecular weight are sold commercially under the trademark Carbowax. Although pure polyoxyethylene glycols of a specified molecular weight can be prepared and can be used in the practice of this invention, the commercially available compounds are actually mixtures of a number of polyoxyethylene glycol polymers of various molecular weights. The commercially available polyoxyethylene glycols up to a molecular weight of about 700 are water-white liquids at room temperature. Those having molecular weights of 1000 or above are solids that vary in consistency at room temperature from a grease to a hard wax.

Polyoxypropylene glycols,

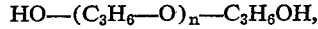

$n=1$ to 10,000, are colorless to light yellow viscous liquids. They are commercially available in molecular weights ranging from approximately 400 to 2000. The low molecular weight polyoxypropylene glycols, i.e. up to a molecular weight of 500, are completely water soluble, while those of higher molecular weight, i.e. from 1000 to 2000, are only slightly soluble in water. Those having an intermediate molecular weight, i.e. from 600 to 900, are moderately soluble in water, about 10 to 20 percent at room temperature. Polyoxypropylene glycols are commercially available under the trademark Niax.

For the most part, the oxyalkylene polymers, which are used in the practice of this invention, contain both oxyethylene groups and higher oxyalkylene groups such as oxypropylene and oxybutylene groups,

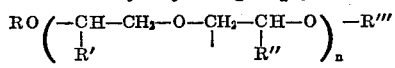

where R, R′, R″ and R‴ can be selected from H, —CH$_3$—, C$_2$H$_5$, C$_3$H$_7$— and C$_4$H$_9$, and $n=1$ to 30,000.

The molecular weights of the mixed oxyalkylene polymers useful in the practice of this invention will be about 600 to 400,000, preferably 600 to 40,000. The mixed oxyalkylene polymers have good solubility in water and are generally liquids at ambient temperatures, even in the higher molecular weight ranges where they are very viscous liquids. In the case of copolymers of ethylene oxide with other alkylene oxides, particularly propylene oxide, the oxyalkylene chain can be composed of blocks of oxyethylene groups connected to blocks of, for instance, oxypropylene groups. Also, the oxyalkylene chains may be heteric or random mixtures of oxyethylene and oxypropylene groups. The ratio of oxyethylene or other oxyalkylene groups may vary, for example, from about 50:50 to about 90:10. The amount of oxyethylene groups in a molecule is such that the oxyalkylene polymers are moderately soluble in water at ordinary temperatures and the amount of higher oxyalkylene groups is such that the oxyalkylene polymers remain liquid at ordinary temperatures at higher molecular weights. Mixed polyoxyalkylene glycols are commercially available under the trademark Ucon.

The oxyalkylene polymer tempering media used in the practice of this invention should be essentially water-free. By essentially water-free is meant that the oxyalkylene polymers contain less than 5 percent by weight water. If greater amounts of water are present, there will be an increased tendency for the glass sheet to fracture during the tempering operations. This problem is particularly serious with thinner glass sheets, i.e. sheets having a thickness of about 0.050 to 0.090 inch. Although not intending to be bound by any specific theory, it is believed that water forms a vapor blanket around the glass sheet when the glass sheet is initially contacted with the tempering medium. This vapor blanket acts as an insulating barrier and inhibits heat transfer (hereinafter called heat flux) at the glass-tempering medium interface, heat being removed principally by radiation through the vapor film. Thus, the glass is initially cooled very slowly and very little potential for temper is developed. Eventually enough heat will be removed by radiation such that the glass has cooled to a temperature below its strain point. This is a temperature at which the glass ceases behaving as a viscous liquid and starts behaving as an elastic solid. At about this temperature, the vapor blanket is no longer stable and the water comes in direct contact with the glass surface and violent boiling ensues. Heat is removed from the surface of the glass as latent heat of vaporization at a very rapid rate. However, since the glass surface is starting to behave as a solid, it cannot tolerate this rapid heat flux and as a result shatters.

The oxyalkylene polymers utilized herein can contain various additives, such as viscosity modifiers, wetting agents, detergents, anti-oxidants and thermal stabilizers. Examples of such additives include carboxy methyl cellulose, sodium alkyl sulfonate, sodium dioctyl sulfosuccinate and tert-butyl catechol. Also, the oxyalkylene polymers can be blended and mixed with other materials such as silicones and hydrocarbon oils.

The glass which is tempered according to the method of this invention is flat glass of the silicate-type, particularly soda-lime-silicate glass, lead-silicate glass and borosilicate glass. The nature and production of silicate glasses is well known in the art, and generally is described in the Encyclopedia of Chemical Technology, by Kirk-Othmer, published by Interscience Encyclopedia Inc., New York, N.Y., volume 7, pages 181–189. The method of the invention has been found to be particularly useful in the tempering of thinner glass sheets, i.e. glass sheets having a thickness of about 0.050 to 0.125 inch, particularly 0.050 to 0.090 inch. The method of the invention is also obviously applicable to thicker glass sheets, i.e. glass sheets having a thickness up to about 1.0 inch.

The geometric configuration of the glass treated in accordance with this invention is not particularly critical in that flat glass sheets and curved glass sheets, for example, curved glass windshields, can be tempered. Also, the instant process can be adapted to operate on a continuous or semi-continuous basis to produce resultant tempered glass sheets having an abraded resistance to fracture by stress of the order of 10,000 to 40,000 pounds per square inch and a central tensile stress of the order of 5,000 to 20,000 pounds per square inch.

In conducting the method of thermally tempering glass in accordance with the practice of this invention, typically, a glass sheet is first heated to a very high temperature above its strain point and below its softening point, preferably somewhere near its softening point. Softening point, as used herein, is that condition in which glass has a viscosity of about $10^{7.6}$ poises. The temperature of the glass at its softening point will vary depending on the particular composition of the glass. For example, soda-lime-silicate glass has a temperature at its softening point of about 1400° F., borosilicate glass has a temperature at its softening point of about 1500° F.

After the glass has been heated to the above-described elevated temperature, it is contacted with the oxyalkylene polymer quenchant whereupon heat is rapidly exchanged between the surface of the glass and the quenchant. The preferred method of contacting the surface of the glass with the quenchant is to completely immerse the glass sheet in a liquid quenchant. This immersion process is known as dip quenching, and is described in U.S. Pat. No. 170,339. Another method of liquid quenching contemplated by this invention is the so-called flood quenching technique which is described in U.S. patent application Ser. No. 108,661, filed Jan. 21, 1971, now Pat. No. 3,725,024. In the flood quenching technique the quenching liquid is continuously flowed at a constant rate to the surfaces of the preheated glass sheet. Still another method of liquid quenching within the scope of the present invention is to quench by spraying the oxyalkylene polymer onto the surfaces of the preheated glass sheet. In the spray quenching process, the oxyalkylene polymer liquid quenching agent is atomized into discrete liquid droplets before contacting the heated glass surface. Spray quenching is well known in the metal tempering art and is disclosed, for example, in U.S. Pat. No. 3,208,742.

The heated glass sheet should be contacted with the oxyalkylene polymer quenchant for a time sufficient to cool the entire thickness of the glass to a temperature substantially below the glass strain point. When glass is cooled through its strain point, it undergoes a transition from behaving as a viscous liquid to behaving as an elastic solid. Once the glass starts behaving as an elastic solid, it will no longer develop any residual stress by rapid cooling, in fact, if cooling is too rapid, the glass will shatter. Therefore, when the entire thickness of the glass has cooled to a temperature substantially below the strain point, the final degree of temper has been attained. The strain point of the glass as used herein is that condition in which the glass has a viscosity of $10^{14.6}$ poises.

The length of time that the oxyalkylene polymer quenchant must be contacted with the glass surface in order to cool the entire thickness of the glass to a temperature below its strain point will vary depending on, among other things, the initial temperature of the glass sheet, the heat flux at the glass-liquid interface, the composition and thickness of the glass, and method of contact, be it flood quenching, spray quenching or dip quenching. As an example, for soda-lime-silicate glass having dimensions of 12 inches x 12 inches x 0.090 inch, heated to a temperature near its softening point and being dip quenched in a polyoxyalkylene glycol liquid quenchant, the total time of contact will be from about 20 to 30 seconds.

In quenching glass at the very high temperatures employed, the heat flux at the glass-tempering medium interface is a complicated phenomenon and is not completely understood. The heat flux does not remain constant and varies, sometimes radically, over the temperature ranges employed in the glass tempering process. This phenomenon can be seen graphically in FIG. 1, which shows plots of heat fluxes (Q) for various tempering media versus tempering temperature (surface temperature of the glass sheet as it is chilled in the quenchant). Curve A represents dip quenching in a paraffin-based hydrocarbon oil, which is sold commercially under the trademark Gulf Martempering Oil #412; Curve B represents dip quenching in a 50/50 (by volume) polyoxyalkylene glycol/water solution sold commercially under the trademark Ucon Quenchant A; Curve C represents dip quenching in an oxyalkylene polymer of the invention, a polyoxyalkylene glycol sold commercially under the trademark Ucon 50 HB-660.

For the purposes of this invention, the heat flux is expressed in the units of British Thermal Units/second-square foot (B.t.u./sec.-ft.$^2$).

Curve A shows a rapid increase in the heat flux as the glass is cooled in the upper temperature regions employed in the tempering process. As the glass begins to cool down through the lower temperature regions employed in the process, the heat flux falls off rather rapidly. This rapid fall off of the heat flux is undesirable and results in a resultant low degree of temper in the glass.

The reason for the resultant low degree of temper is that as the heat flux at the glass-tempering medium interface falls off, the rate of heat exchange between the interior regions and the surface of the glass overcomes the decreasing heat flux at the glass surface. Consequently, the temperature differential between the interior and the surface of the glass becomes less and less as the glass is cooled down through its strain point. Since the final degree of temper depends on the temperature differential existing between the midplane and the surface of the glass when the midplane of the glass has passed through the strain point, it is readily apparent that the falling off of the heat flux at the glass-tempering medium interface before the interior of the glass has passed through the strain point is particularly undesirable.

Curve C represents a heat transfer curve of an oxyalkylene polymer of the invention. Curve C shows an initial increase in the heat flux as the glass is initially cooled. As the glass is further cooled, the heat flux does not fall off rapidly as is shown in Curve A, thus providing a higher average heat flux in the lower temperature regions and the maintaining of a higher degree of temper in the resulting glass article.

Figure 2:
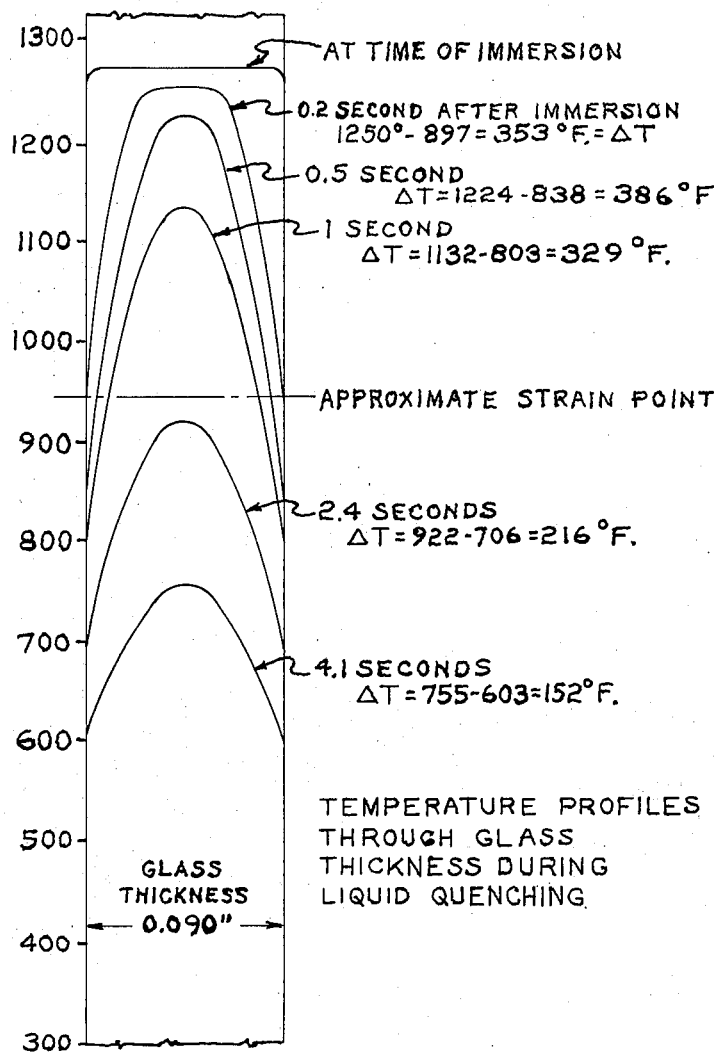
FIGS. 2 and 3 are temperature profiles calculated through glass thicknesses during liquid quenching.
Figure 3:
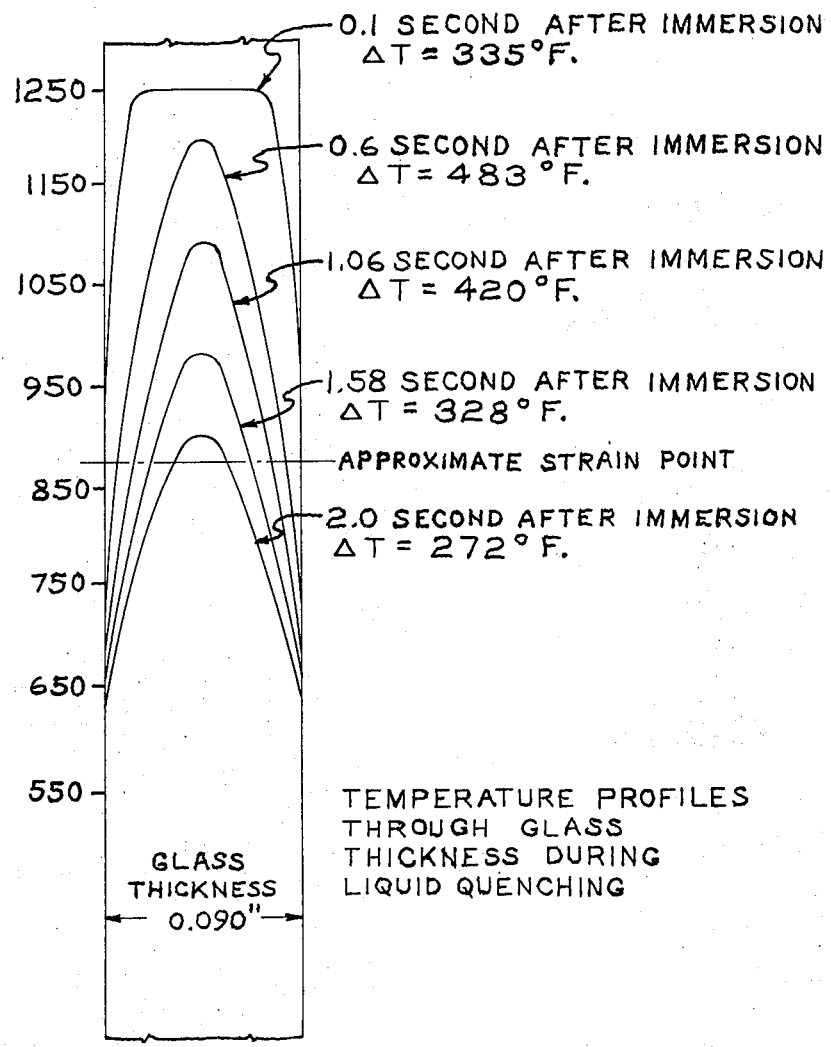

Another showing of the phenomena of heat flux at the glass-liquid interface and its effect on the tempering of glass sheets can be seen in FIGS. 2 and 3. FIGS. 2 and 3 are calculated temperature profiles taken through conventional soda-lime-silica glass thicknesses during liquid quenching.

FIG. 2 is a temperature profile counterpart to Curve A of FIG. 1. In FIG. 2, 0.2 second after immersion, the temperature differential between the interior and the surface of the glass is 353° F. The heat flux at this time has started to fall off rapidly, however, as is seen in Curve A of FIG. 1. After 1 second of immersion, the temperature differential is shown as only 329° F. As can be seen from the drawing, it takes 2.4 seconds for the interior of the glass to cool to a temperature substantially below the strain point where the final degree of temper is attained and the temperature differential at this point is 216° F.

FIG. 3 is the temperature profile counterpart of Curve C of FIG. 1.

FIG. 3 shows that 0.1 second after immersion, the temperature differential between the interior and the surface is 335° F. After 0.6 second into the quench, the temperature differential between the interior and the surface of the glass is 483° F. At this point the heat flux has started to fall off, but the drop off is not nearly as rapid as in the system depicted by Curve A of FIG. 1. The interior of the glass has cooled to a temperature substantially below its strain point 2.0 seconds after immersion, and the final degree of temper has been attained. The temperature differential at this point is 272° F., which is significantly greater than the temperature differential of 216° F. obtained by the system shown in FIG. 2 and Curve A of FIG. 1.

In the systems depicted in FIG. 3 and Curve C of FIG. 1, the heat leaving at the glass surface remains relatively high in comparison to the heat arriving at the surface from the interior of the glass. Consequently, the temperature differential between the interior and the glass surface remains substantially unchanged as the interior of the glass passes through the strain point. The greater the temperature differential when the midplane of the glass passes through the strain point, of course, the greater the final degree of temper in the resultant glass article.

The oxyalkylene polymers have been found to provide a relatively high and constant heat transfer at the glass-oxyalkylene polymer interface, which provides for a resultant high temper in the glass, even in thin glass sheet. With thin glass, heat exchange between the midplane and the surface is more rapid than with thicker glass. Therefore, in order to achieve as high a degree of temper in thin glass as is obtainable with thicker glass, the heat flux at the glass-tempering medium interface must be substantially greater.

To successfully temper thin glass, that is, glass having a thickness of 0.050 to 0.125 inch, particularly 0.050 to 0.090 inch, the oxyalkylene polymer should be selected from those which provide an average heat flux of 40–80 B.t.u./sec.-ft.$^2$ over the temperature range used in the tempering process. This temperature range is defined as the surface temperature of glass near its softening point down to a surface temperature at which the midplane of the glass passes substantially through the strain point. For conventional soda-lime-silica glass, this temperature range would be from 1250 to 550° F. Lower average heat fluxes result in an incomplete temper, whereas higher average heat fluxes result in higher incidences of glass fracture during tempering. With thicker glass, that is, glass having a thickness of 0.25 inch or greater, average heat fluxes as low as 30 B.t.u./sec.-ft.$^2$ can be used and a full temper attained.

In addition, for tempering thinner glass, the oxyalkylene polymer preferably should be selected from those which have heat flux curves which peak or have maximums below 150 B.t.u./sec.-ft.$^2$, and this maximum should preferably be reached before the surface of the glass has cooled to a temperature below the strain point. However, even though the heat flux is decreasing when the glass is cooling through its strain point, the heat flux curves should still provide for a minimum average heat flux in the end portion of the curve so that the temper which has been developed in the early portions of the curve will not be dissipated. The oxyalkylene polymers have been found to provide the necessary minimum heat fluxes in the end portions of the curve to meet this requirement. For thicker glass sheets (>0.25 inch), the oxyalkylene polymer should be selected from those which provide a heat flux at the glass-oxyalkylene polymer interface which averages above 15 B.t.u./sec.-ft.$^2$ as the glass is cooled through the lower temperature regions of the tempering process. These lower temperature regions are defined as the glass surface temperature near its strain point down to a lower surface temperature corresponding to when the midplane of the glass passes substantially through the strain point. For conventional soda-lime-silica glass, this surface temperature range is about 940 to 550° F. For thinner glass (0.050 to 0.090 inch), the average heat flux in the lower temperature regions should be somewhat higher, averaging above 20 B.t.u./sec.-ft.$^2$, generally within the range of 20 to 50 B.t.u./sec.-ft.$^2$.

As has been described above, the oxyalkylene polymers, particularly the polyalkylene glycols, provide what we believe to be superior heat transfer properties for thermal tempering glass sheet. The oxyalkylene polymers provide a relatively high average heat transfer coefficient over the entire providing range used in the tempering process, thus providing for a high development of tempering stress. Further, the heat flux in the lower temperature regions of the tempering process remains relatively high and does not drastically fall off, thus insuring that the temper developed during the initial rapid cooling is not dissipated. Besides these advantages, the oxyalkylene polymers have been found to respond in a surprising and favorable fashion to changes in temperature.

During liquid quenching, the heat flux at the glass-liquid interface is expressed as:

$$Q = \frac{h \Delta T}{3600}$$

where $Q$ = heat flux in B.t.u./sec.-ft.$^2$,
$h$ = heat transfer coefficient in B.t.u./hr.-ft.$^2$-° F.
$\Delta T$ = difference between the surface temperature (° F.) of the glass at any given time and the temperature of the tempering medium which is constant for any given set of conditions.

Figure 4:
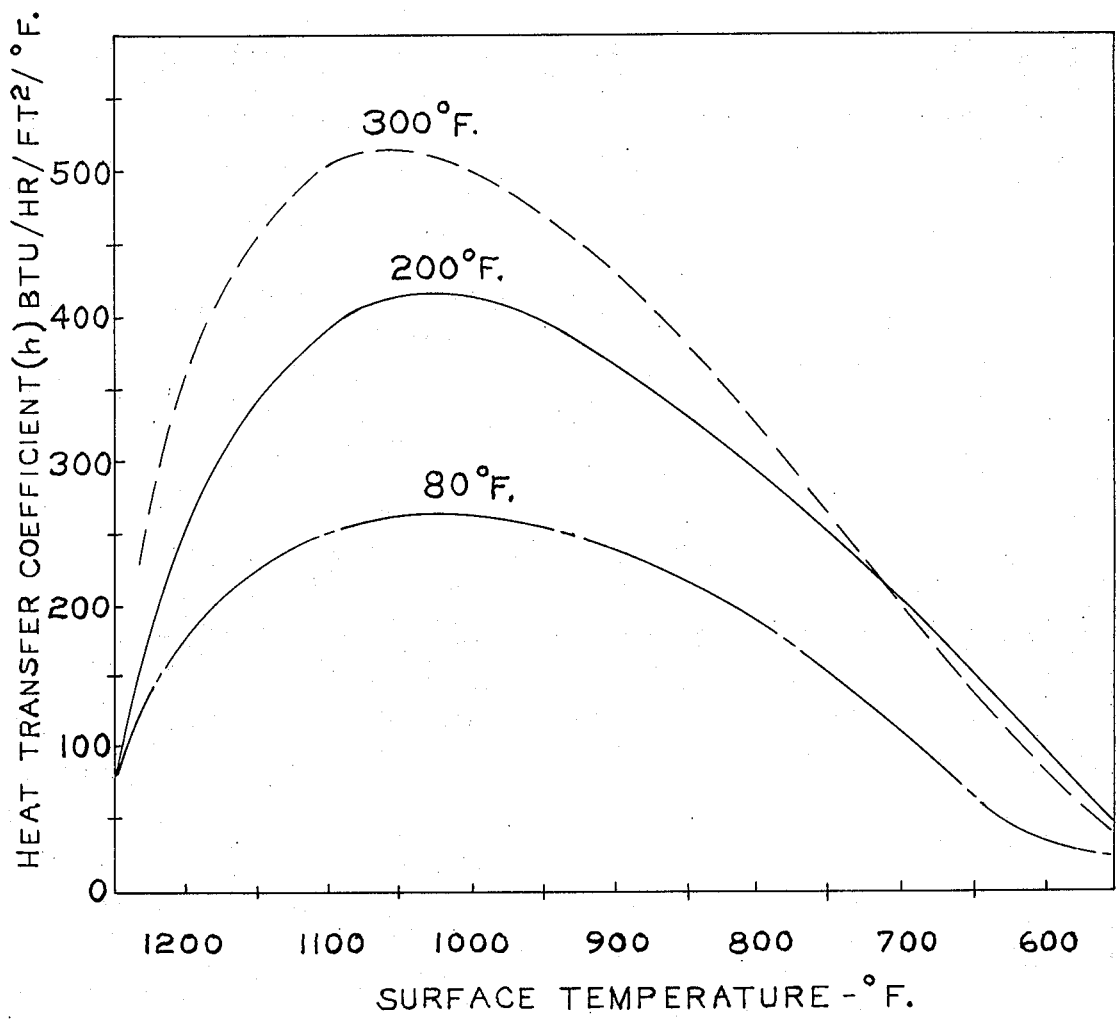
FIG. 4 is a graph of the heat transfer coefficient of an oxyalkylene polymer of the invention at different temperatures plotted against surface temperature.

In some cases, such as with silicone tempering agents, the heat transfer coefficient remains virtually unchanged with changes in the liquid quenching agent temperature. But with the oxyalkylene polymers, the heat transfer coefficient substantially increases with increases in temperature. This can be seen in FIG. 4 which shows graphs of the heat transfer coefficient plotted as a function of tempering temperature. In FIG. 4, 3 plots are shown and correspond to 3 liquid quenchings conducted with a polyoxyalkylene glycol sold commerciallly under the trademark Ucon 50 HB–660 at temperatures of 80, 200 and 300° F. The plots show that increasing the temperature of the oxyalkylene polymer increases the heat transfer coefficient over the entire temperature range used in the tempering process.

In the instance where the heat transfer coefficient is unaffected by changes in liquid temperature, such as with the silicones, the capability to temper glass decreases with increased liquid temperature, while with the oxyalkylene polymers, depending on the liquid temperature, the tempering capability may increase or decrease. This is very important in developing yields in a liquid quenching operation since it has observed that breakage decreases with increasing liquid temperature.

Thus, to increase the tempering capacity of a given oxyalkylene polymer, its temperature can be raised. Generally, at about 150–200 F., the oxyalkylene polymers reach their maximum tempering capacity. At higher temperatures, the tempering capacity falls off due to a decrease in heat flux, since the $\Delta T$ term in $Q = h \Delta T$ decreases with increasing temperature.

EXAMPLES

In the working examples, the heat transfer characteristics of various oxyalkylene polymers were determined as follows:

A 4 inch x 4 inch x ¼ inch copper plate with higher polished surfaces which had embedded within it a high response thermocouple to measure temperature of the copper plate, was heated to a temperature near the softening point of conventional soda-lime-silica glass (about 1400° F.). The copper plate was then immediately immersed in the particular oxyalkylene polymer being evaluated. The thermocouple was attached to a recorder chart which recorded the decrease in temperature of the plate as a function of time. From this time-temperature data, the heat transfer coefficient ($h$) and the heat flux ($Q$) of the particular liquids being tested can be determined as a function of temperature of the copper plate somewhat as follows:

A heat balance in exchange of energy is given by the following equation:

$$MC_p(dT/dt) = hA(T_P - T_L)$$

where

M = mass of metal
$C_p$ = specific heat of metal
$dT/dt$ = cooling rate of metal
h = heat transfer coefficient
A = area of metal configuration
$T_P - T_L$ = temperature difference between metal and liquid The copper plate with the high response thermocouple embedded in the center can be used as the sensor since the high conductivity of copper will permit one to make the assumption of temperature uniformity through the plate thickness and thus make for a simplfying approximation in the use of the heat balance equation. Actual calculations indicate that with a heat transfer coefficient of the order of 500 B.t.u./hr.-ft.$^2$-° F., the maximum temperature gradient through a ¼ inch high purity copper plate is of the order of 5° F. One then can use the $dT/dt$ of the sensor as representative of the metal cooling rate. Thus from a time-temperature output, it is possible to calculate h, from $$h = \frac{\rho s z C_p (dT/dt)}{2(s+2z)(T_P - T_L)} = K_2 \frac{(dT/dt)}{T_P - T_L}$$

where $\rho$ = density of material (lbs./ft.$^3$)
s = side of the square (ft.)
z = thickness (ft.)
$C_p$ = specific heat of metal (B.t.u./lb.-° F.)
$T_L$ = liquid temperature (° F.)
$dT/dt$ = cooling rate (° F./sec.)

It is possible to calculate Q from $$Q = h(T_P - T_L) = K_2(dT/dt)$$

where h = heat transfer coefficient in B.t.u./sec.-ft.$^2$-° F.
$T_P - T_L$ = temperature difference between metal and liquid For a copper plate of 99.9 purity with s = ⅓ ft., z = 1/48 ft., $\rho$ = 559 lbs./ft.$^3$, $C_p$ = 0.0915 B.t.u./lb.-° F. and $$K_2 = 0.4736$$

The time-temperature output can be reduced to produce h versus plate temperature and Q versus plate temperature through a computer program. With the h and Q versus plate temperature curve, one can use a special computer program to calcualte the temperature through a glass plate in time.

After the heat transfer characteristics of the various oxyalkylene polymers are determined, they can be evaluated as quenching agents for glass sheet as follows:

A 12 inch x 12 inch x 0.090 inch soda-lime-silicate glass sheet is heated in an electrical resistance furnace at about 1400° F. for 1½ to 2 minutes. The glass sheet is then immediately and completely immersed for about 20–30 seconds in 25–30 gallons of the particular oxyalkylene polymer being evaluated. The glass sheet is then removed from the quenching bath, cleaned and prepared for testing for the resultant degree of temper.

Examples I to IV

Figure 5:
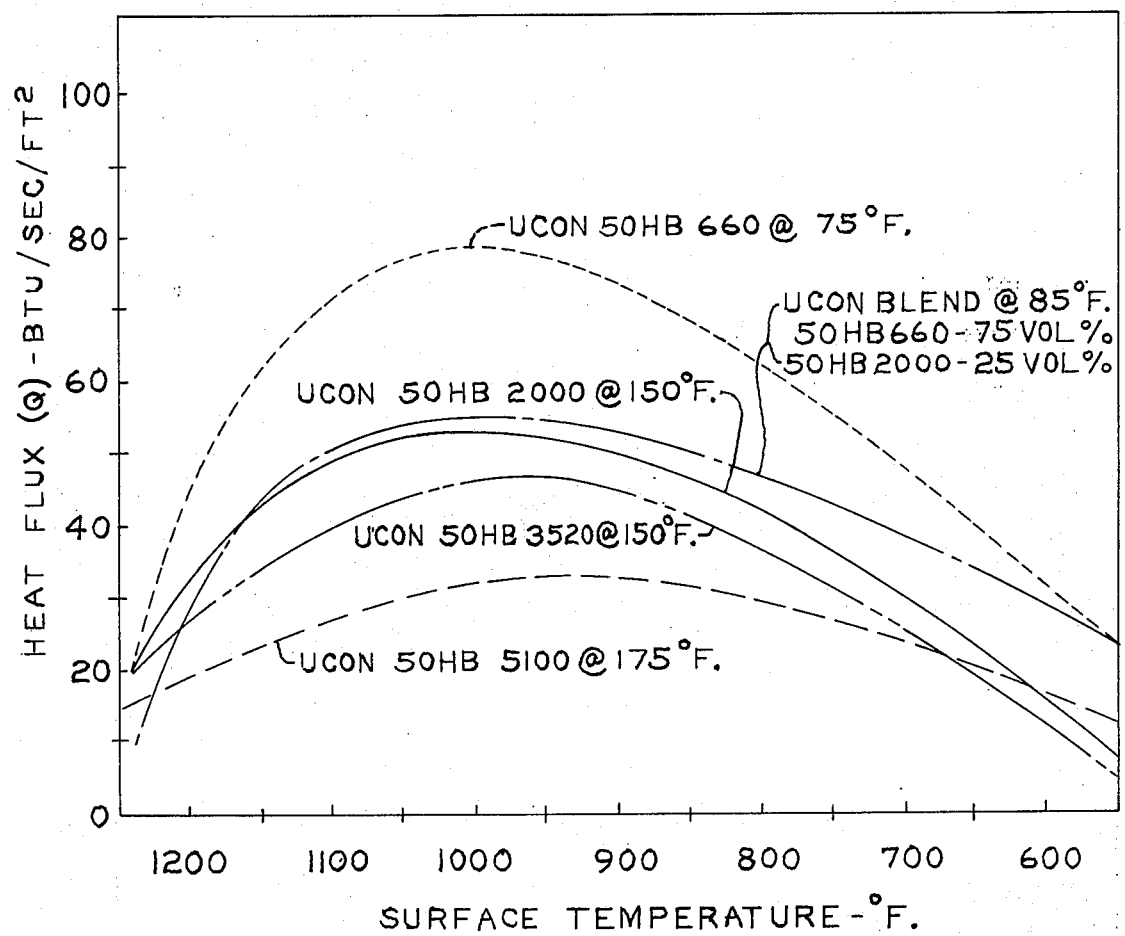

The heat transfer characteristics of a series of polyoxyalkylene glycols sold commercially under the trademarks Ucon 50 HB-660, Ucon 50 HB-2000, Ucon 50 HB-3520, Ucon 50 HB-5100, and a blend of 75/25 (by volume) of Ucon 50 HB-660 and Ucon 50 HB-2000 are evaluated as described above. A graph of the heat flux of these various polyoxyalkylene glycols plotted against surface temperature of the copper plate is shown in FIG. 5. Some of the liquids were then evaluated as a quenching liquid for glass as described above. The results are summarized in Table I below:

TABLE I.— DEGREE OF TEMPER ATTAINED BY DIP QUENCHING GLASS SHEET IN VARIOUS POLYOXYALKYLENE GLYCOLS

| Example No. | Polyoxyalkylene glycol | Bath temperature, ° F. | Degree of temper attained in a 12 in. x 12 in. x 0.090 in. soda-lime-silicate glass sheet as measured by a differential surface refractometer (pounds/square inch) |
|---|---|---|---|
| I | Ucon 50 HB-2000 | 112 | 21,500 |
| II | Ucon 50 HB-2000 | 100 | [1] 18,800 |
| III | Ucon 50 HB-3520 | 150 | 19,000 |
| IV | Ucon 50 HB-5100 | 125 | 18,000 |

[1] Glass specimen tempered was 12 in. x 12 in. x 0.070 in. glass sheet.

The above experiments indicate that the polyoxyalkylene glycols investigated all had excellent heat transfer characteristics as determined by measuring the heat flux as a function of surface temperature. Also, when certain of these liquids are used for thermally tempering glass sheet by dip quenching, they provide for a high degree of temper in the glass.

Examples V to VII

Figure 6:
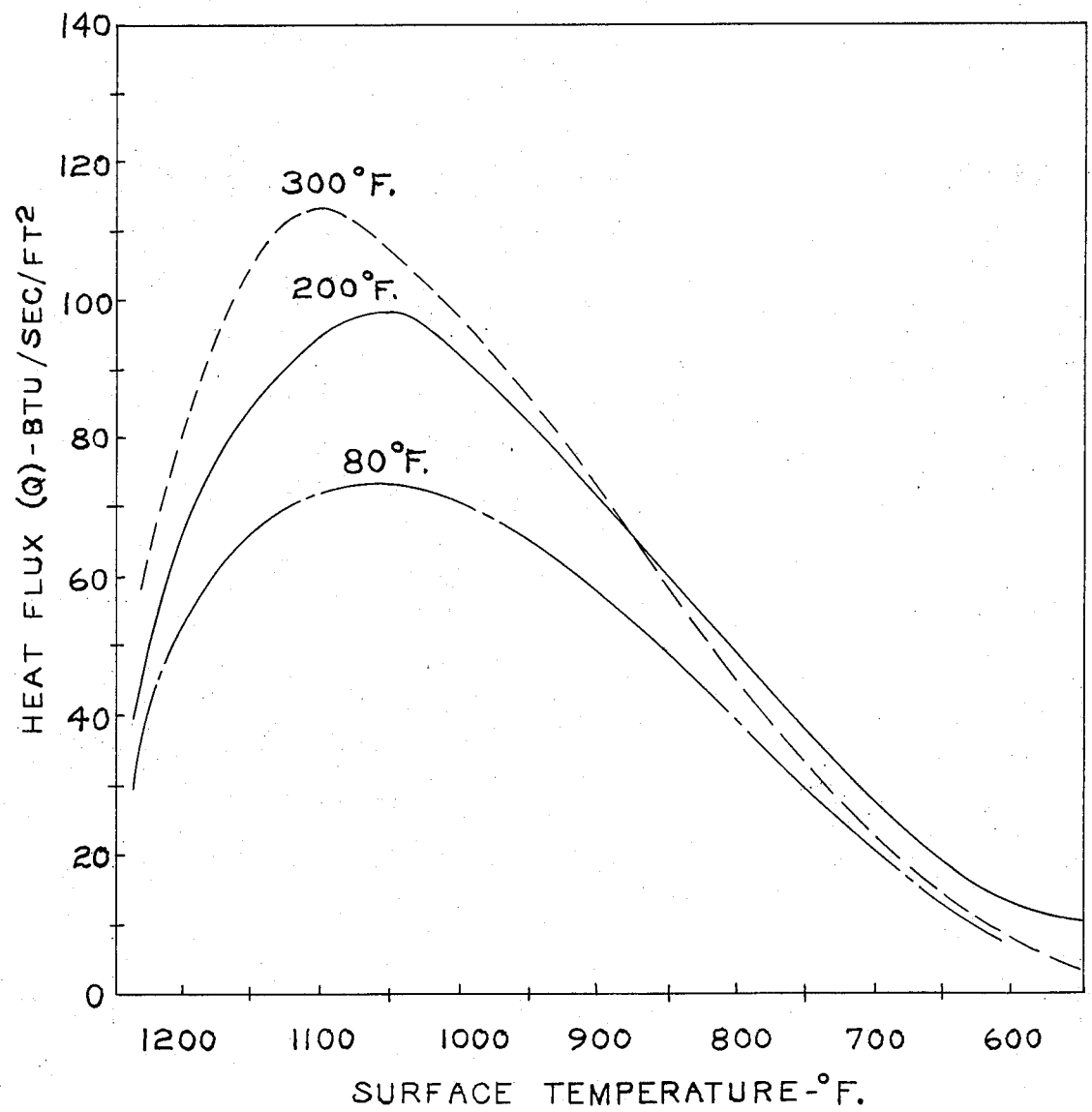

To show the effect that initial bath temperature has on the heat transfer characteristics of a typical polyoxyalkylene glycol, the following experiments were conducted. Three quenching baths comprised of a polyoxyalkylene glycol sold commercially under the trademark Ucon 50 HB-660 were prepared. The liquids in the bath were heated to temperatures of 80, 200 and 300° F., respectively. The heat transfer characteristics of the polyoxyalkylene glycol heated to the three different initial bath temperatures were then determined as described in Examples I to IV. A graph of the heat transfer coefficient plotted against surface temperature of a copper plate is shown in FIG. 4, and a graph of the heat flux plotted against surface temperature is shown in FIG. 6.

After the heat transfer characteristics were determined as described above, the polyoxyalkylene glycols at the three different temperatures were then evaluated respectively as quenching agents for glass sheet in the manner provided by Examples I to IV described above. The resultant degree of temper in the dip quenched glass sheet is reported in Table II below.

TABLE II.—DEGREE OF TEMPER ATTAINED BY DIP QUENCHING GLASS SHEET IN A POLYOXYALKLENE GLYCOL AT VARIOUS BATH TEMPERATURES

| Example No. | Polyoxyalkylene glycol | Bath temperature, ° F. | Degree of temper attained in a 12. in x 12 in. x 0.090 in. soda-lime-silicate glass sheet as measured by differential surface refractometer (pounds/square inch) |
|---|---|---|---|
| V | Ucon 50 HB-660 | 80 | 25,000 |
| VI | Ucon 50 HB-660 | 200 | 28,500 |
| VII | Ucon 50 HB-660 | 300 | 25,000 |

Example VIII

For the purposes of comparison with the polyoxyalkylene glycols tested above in Examples I through VII, a hydrocarbon oil sold commercially under the trademark Gulf Martempering Oil #412 was evaluated for heat transfer characteristics. The graph of the heat flux of the hydrocarbon oil plotted as a function of surface temperature of the copper plate is shown in FIG. 1, Curve A. If this liquid were used as a quenching agent for glass sheet as described in Examples I through IV, the degree of temper attained in the glass sheet would be very low.

Example IX

For the purposes of comparison, the heat transfer characteristics of a polyalkylene glycol-water solution were determined as described in the procedures of Example I to IV. The solution is a 50/50 (by volume) solution of polyoxyalkylene glycol sold commercially under the trademark Ucon Quenchant A and water. A graph of a heat flux potted against surface temperature of a copper plate is shown in Curve B of FIG. 1. If this solution were used as a quenching agent for dip quenching glass sheet as described in Examples I to IV above, the glass sheet would fracture in the quenching bath.

Examples X to XV

Figure 7:
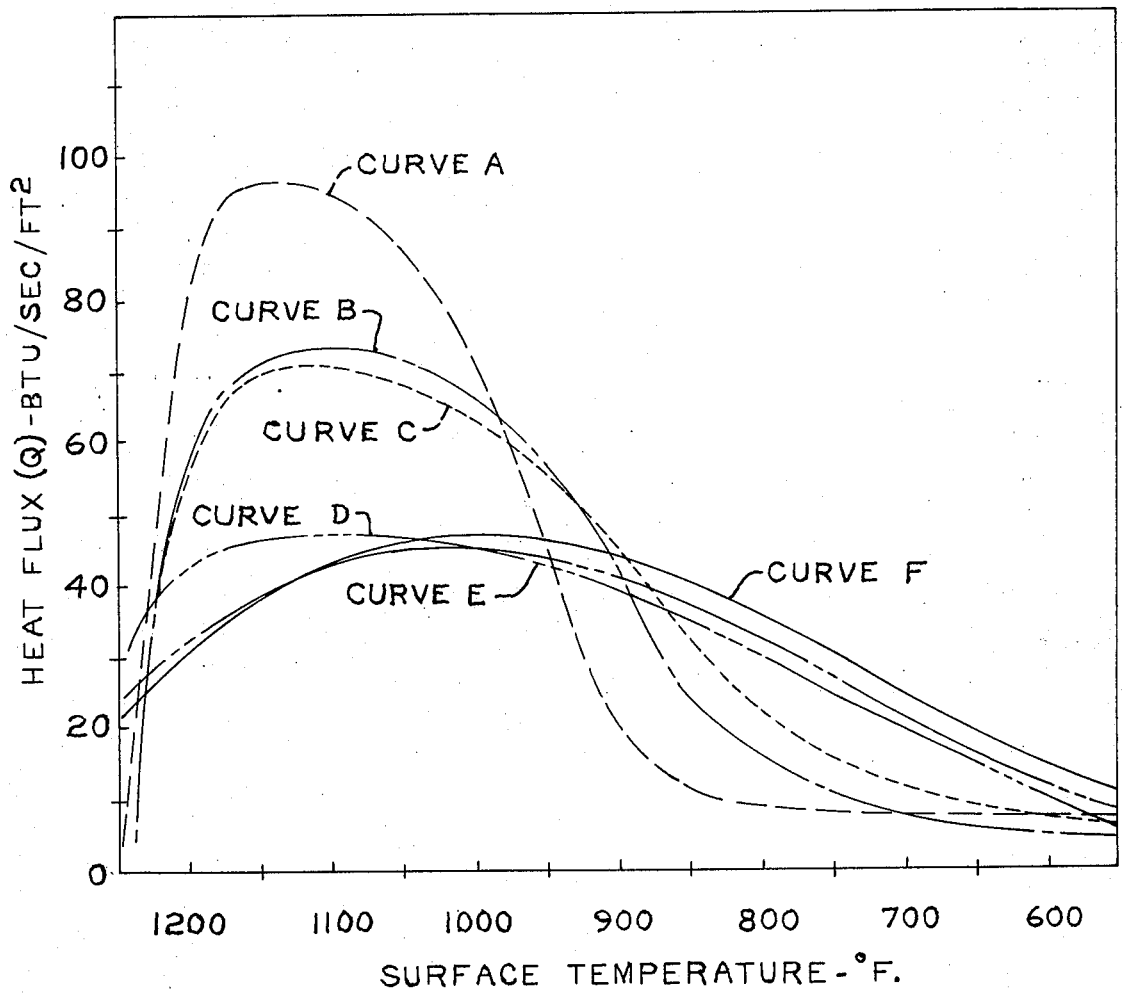

The heat transfer characteristics of a paraffin-based hydrocarbon oil sold commercially under the trademark Gulf Martempering Oil #412, and of a polyalkylene oxide sold commercially under the trademark Ucon LB–1800X, and of various mixtures of the two were determined using the copper plate method as described above. A graph of the heat transfer coefficients of these various quenchants plotted against surface temperature is shown in FIG. 7. A summary is given in Table III below:

TABLE III.—HEAT TRANSFER CHARACTERISTICS OF VARIOUS HYDROCARBON OIL-POLYALKYLENE OXIDE MIXTURES

| Example No. | Mixture, percent by volume, Gulf Martempering Oil #412/percent by volume Ucon LB-1800X | Particular curve in Fig. 7 | Evaluation of liquid and liquid mixtures as a quenchant for tempering flat glass |
|---|---|---|---|
| X | 100/0 | A | Poor. |
| XI | 90/10 | B | Poor, but better than Ex. I. |
| XII | 70/30 | C | Good. |
| XIII | 30/70 | D | Do. |
| XIV | 10/90 | E | Good-fair. |
| XV | 0/100 | F | Fair. |

We claim:

1. In a method for tempering glass sheet which comprises heating the glass to a temperature near its softening point and then contacting the glass with a quenching medium to rapidly chill the glass to a temperature below the strain point, the improvement wherein the quenching medium is an essentially water-free oxyalkylene polymer having an average molecular weight of at least about 400, and being a liquid at the temperatures employed in the glass tempering process, said polymer maintaining a high heat flux at the glass-tempering medium interface and a high temperature differential between the mid-plane and the surface of the glass until the glass is cooled through the strain point.

2. The method of claim 1 in which the oxyalkylene polymer is a polyoxyalkylene glycol.

3. The method of claim 1 in which the oxyalkylene polymer is blended with a material selected from the class consisting of silicones and hydrocarbon oils.

4. The method of claim 1 in which the oxyalkylene polymer is preheated to above room temperature but below its decomposition temperature before contacting the glass.

5. The method of claim 4 in which the oxyalkylene polymer is preheated to a temperature of up to 250° F.

6. The method of claim 1 in which the glass is contacted with the oxyalkylene polymer by completely immersing the glass in the oxyalkylene polymer.

7. The method of claim 1 in which the oxyalkylene polymer provides:

(a) an average heat flux between 30 to 80 British thermal units/second-square foot over the entire temperature range used in the tempering process, and (b) an average heat flux of above 15 British thermal units/second-square foot as the surface of the glass cools from a temperature near its strain point down to a lower temperature at which the midplane of the glass passes through the strain point.

8. The method of claim 7 in which the average heat fluxes of claim 7(a) and claim 7(b) are:

(a) 40 to 80 British thermal units/second-square foot, and (b) 20 to 50 British thermal units/second-square foot, respectively.

References Cited

UNITED STATES PATENTS 2,881,566  4/1959  Badger _____ 65—30

FOREIGN PATENTS 1,446,244  6/1966  France _____ 65—116

ARTHUR D. KELLOGG, Primary Examiner

U.S. Cl. X.R.

65—30

UNITED STATES PATENT OFFICE
CERTIFICATE OF CORRECTION

Patent No. 3,794,476    Dated February 26, 1974

Inventor(s) Edmund R. Michalik and Harold R. Gorman

It is certified that error appears in the above-identified patent and that said Letters Patent are hereby corrected as shown below:

Column 5, line 29, change "to" to --over--.

Column 7, line 75, change "providing" to --tempering--.

Column 8, line 51, insert --°-- after "200".

Column 9, after line 34, insert --$T_p$ = plate temperature (°F.)--.

Column 9, line 52, change "calcualte" to --calculate--.

Column 10, line 11, change "21.500" to --21,500--.

Signed and sealed this 18th day of June 1974.

(SEAL)
Attest:

EDWARD M. FLETCHER, JR.
Attesting Officer

C. MARSHALL DANN
Commissioner of Patents